(12) United States Patent
Sugimoto et al.

(10) Patent No.: US 7,614,067 B2
(45) Date of Patent: Nov. 3, 2009

(54) CONTENT REPRODUCTION APPARATUS AND REPRODUCTION METHOD

(75) Inventors: Hiroko Sugimoto, Yawata (JP); Tomohiko Kitamura, Hirakata (JP)

(73) Assignee: Panasonic Corporation, Osaka (JP)

( * ) Notice: Subject to any disclaimer, the term of this patent is extended or adjusted under 35 U.S.C. 154(b) by 917 days.

(21) Appl. No.: 11/022,393

(22) Filed: Dec. 23, 2004

(65) Prior Publication Data

US 2005/0108774 A1 May 19, 2005

Related U.S. Application Data

(62) Division of application No. 09/929,647, filed on Aug. 14, 2001, now abandoned.

(30) Foreign Application Priority Data

Aug. 29, 2000 (JP) .............................. 2000-258649

(51) Int. Cl.
*H04N 7/10* (2006.01)
*H04N 7/025* (2006.01)
(52) U.S. Cl. ........................... 725/34; 725/32; 725/139
(58) Field of Classification Search .................. 725/32, 725/34, 139
See application file for complete search history.

(56) References Cited

U.S. PATENT DOCUMENTS

| | | | |
|---|---|---|---|
| 5,532,735 A * | 7/1996 | Blahut et al. ................... | 725/32 |
| 5,664,948 A | 9/1997 | Dimitriadis et al. | |
| 5,903,262 A | 5/1999 | Ichihashi et al. | |
| 5,907,321 A | 5/1999 | Grossman et al. | |
| 5,987,210 A | 11/1999 | Iggulden et al. | |
| 6,002,394 A * | 12/1999 | Schein et al. .................. | 725/39 |
| 6,029,045 A | 2/2000 | Picco et al. | |
| 6,035,304 A | 3/2000 | Machida et al. | |
| 6,177,931 B1 * | 1/2001 | Alexander et al. ............ | 725/52 |
| 6,588,015 B1 | 7/2003 | Eyer et al. | |
| 6,698,020 B1 * | 2/2004 | Zigmond et al. .............. | 725/34 |
| 7,146,627 B1 * | 12/2006 | Ismail et al. ................... | 725/47 |

FOREIGN PATENT DOCUMENTS

| | | |
|---|---|---|
| EP | 0 924 927 A2 | 6/1999 |
| WO | 99/56473 | 11/1999 |
| WO | WO 00/10327 | 2/2000 |

* cited by examiner

*Primary Examiner*—James Sheleheda

(57) ABSTRACT

A content reproduction apparatus functioning to (a) reproduce broadcast program content ("BC"), being image, sound, and other data, that has been received, (b) store commercial content ("CC"), being data such as commercials, announcements, and the like, and (c) cancel the reproduction of the CC during specified broadcast programs.

2 Claims, 14 Drawing Sheets

Fig.2

| Broadcast Program | Size(%) | CC Reproduction Period(sec.) | Reproduction-Off Instruction Acceptance Condition |
|---|---|---|---|
| Period Immediately Before/After Pre-select Timeslot | 50 | 30 | Acceptable |
| Unsubscribed | 80 | 5 | Not Acceptable |
| Non-Broadcast Period | 80 | 5 | Not Acceptable |

Fig.3

| Pre-select Channel No. | Pre-select Date | Pre-select Timeslot | Broadcast Program Title |
|---|---|---|---|
| 200 | June 1 | 16:00~18:00 | Animation 4 |
| 300 | June 1 | 19:30~22:00 | Movie 3 |
| | | | |
| | | | |
| | | | |
| | | | |

Fig.4

Channel 200
06/01/2001
9:00~10:30
　「Animation 1」
10:30~11:30
　「Animation 2」
11:30~12:00
　「Animation 3」
12:00~15:00
Non-Broadcast Period
16:00~18:00
　「Animation 4」
- - - - - - - - -
- - - - - - - - -

Channel 300
06/01/2001
9:00~15:00
Non-Broadcast Period
16:00~18:00
　「Movie1」
18:00~19:30
　「Movie2」
19:30~22:00
　「Movie3」
- - - - - - - - -
- - - - - - - - -

Fig.5

| Channel No. | Broadcast Program Type | Subscription Status |
|---|---|---|
| 200 | Pay | Subscribed |
| 300 | Pay | Subscribed |
| 400 | Free | – |
| 500 | Pay | Unsubscribed |
| 600 | Pay | Unsubscribed |

Fig.9

| Registered Instruction | Size(%) | CC Reproduction Period(sec) | Reproduction-off Instruction Acceptance Condition |
|---|---|---|---|
| Power On | 100 | 5 | Not Acceptable |
| Power Off | 100 | 20 | Not Acceptable |
| Channel Change | 50 | 5 | Acceptable |
| Volume Change | 20 | 5 | Acceptable |
| Sound Change | 20 | 5 | Acceptable |

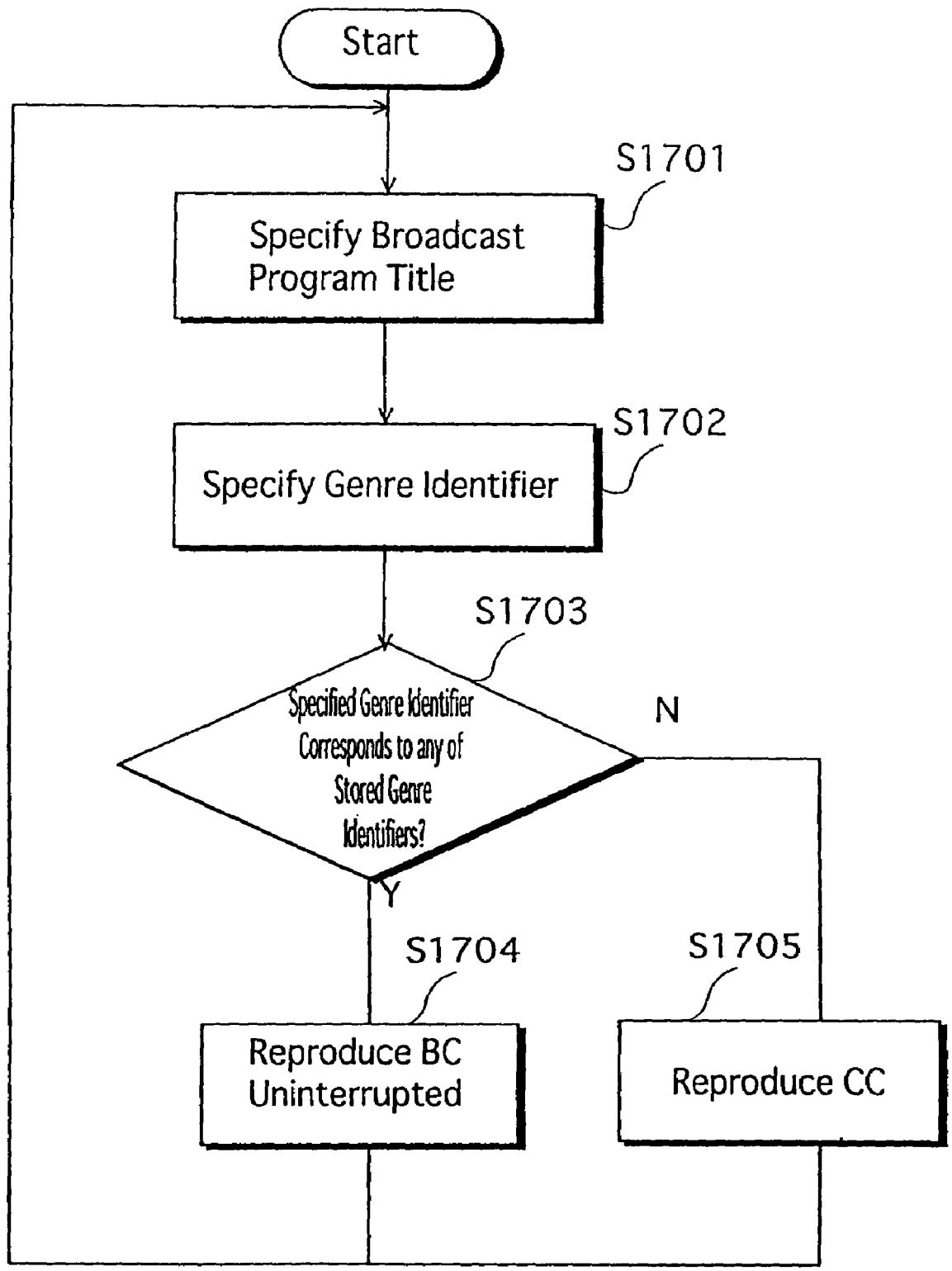

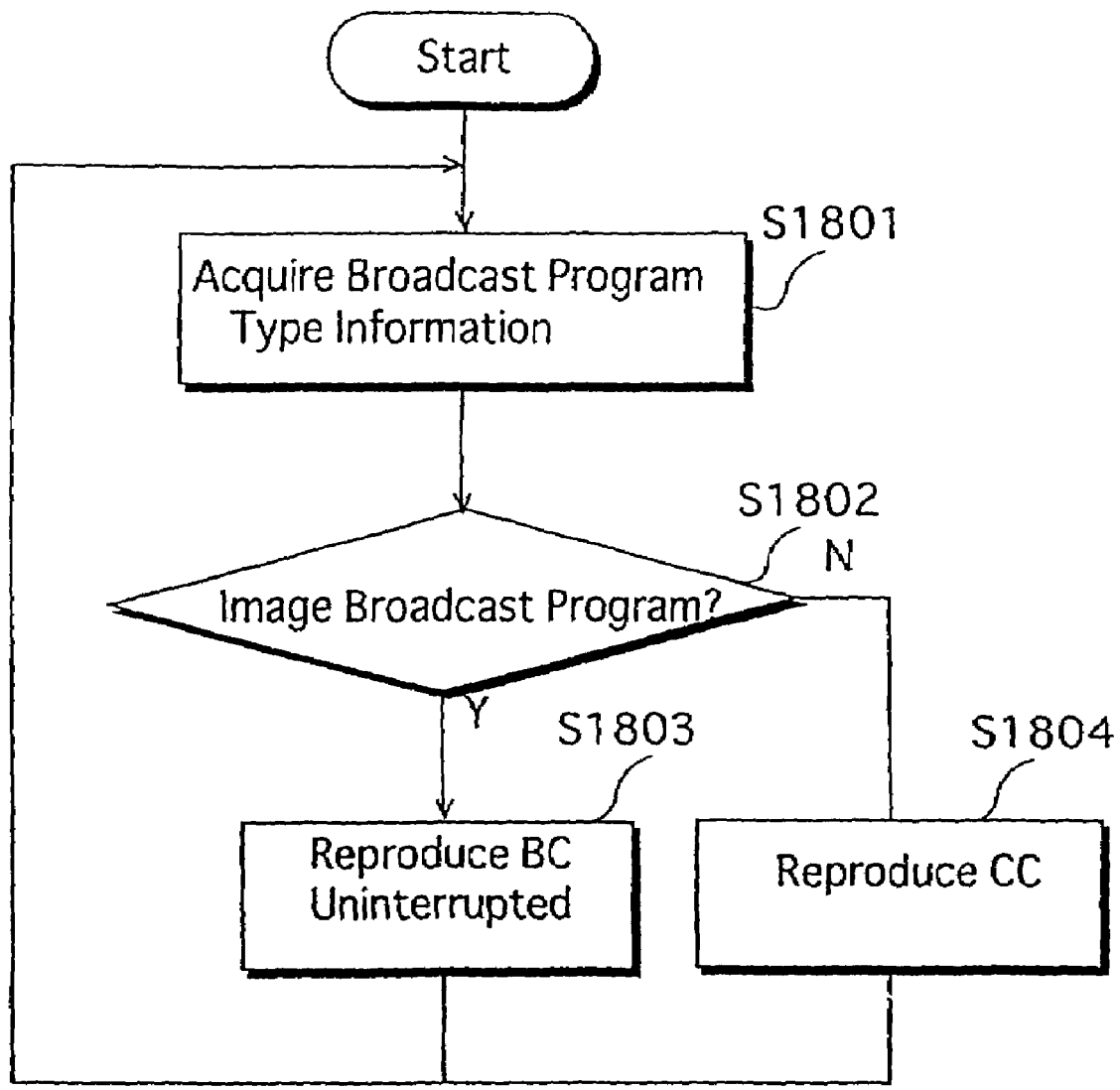

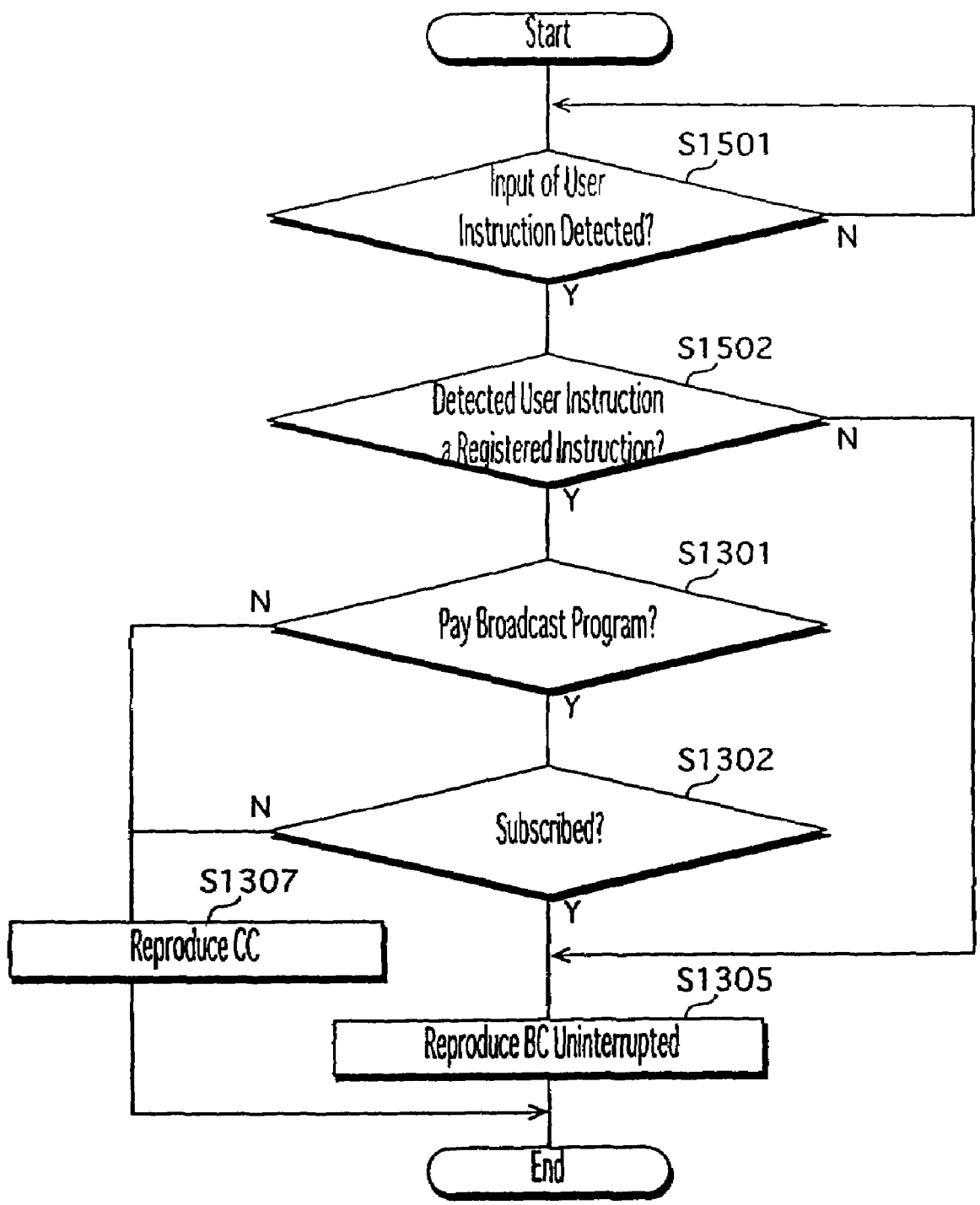

CONTENT REPRODUCTION APPARATUS AND REPRODUCTION METHOD

RELATED APPLICATION

This application is a divisional application of U.S. Ser. No. 09/929,647, filed on Aug. 14, 2001 now abandoned.

BACKGROUND OF THE INVENTION

1. Field of the Invention

The present invention relates generally to a digital broadcast receiving apparatus, and more particularly to (a) a content reproduction apparatus for reproducing content such as commercials, announcements, and other information, and (b) a related reproduction method.

2. Related Art

Television commercials (CMs) are generally broadcast at predetermined times during or at the beginning/end of television programs (broadcast programs), thus effectively forcing the viewer of the TV program to watch the commercials. New and varied ways of having the viewer watch the commercials have emerged with the increasing popularity in recent years of digital satellite broadcasting and cable television.

Examples of such services include interactive commercials, which allow requests for product information and product ordering to be conducted via a remote control, and linked CM data broadcasts, whereby a detailed description of an advertised product is broadcast when the viewer inputs a request via a remote control.

Broadcasting TV commercials in this way is, however, disadvantageous for both the viewer and the advertiser. The viewer who wants to watch a particular TV program uninterrupted is going to be irritated by the periodical broadcasting of commercials, and the effectiveness of the commercial from the advertiser's point of view is reduced because the commercials continue to be broadcast even when the viewer is not watching.

SUMMARY OF THE INVENTION

In view of the above issues, a first objective of the present invention can be realized by providing (a) a content reproduction apparatus for reproducing a content, being commercials and the like, during a specified timeslot that does not bother the viewer, and (b) a related reproduction method. The content reproduction apparatus includes a content storing unit for storing commercial content, a receiving unit for receiving broadcast programs, a first reproducing unit for reproducing the received broadcast programs on a monitor, a specifying unit for specifying a broadcast program that will be reproduced without the commercial content being reproduced, and a second reproducing unit for reproducing the stored commercial content on the monitor when the broadcast program being reproduced is not the specified broadcast program. The specifying unit can include an attribute judging unit for judging whether an attribute of the broadcast program being reproduced corresponds to a specified attribute, the specifying unit then specifying the broadcast program judged to have a corresponding attribute as the broadcast program that will be reproduced without the commercial content being reproduced.

The reproduction method for the content reproduction apparatus of the first objective includes a receiving step for receiving broadcast programs, a first reproducing step for reproducing the received broadcast programs on a monitor, a specifying step for specifying a broadcast program that will be reproduced without the commercial content being reproduced, and a second reproducing step for reproducing the stored commercial content on the monitor when the broadcast program being reproduced is not the specified broadcast program.

Also, a computer program of the first objective, which is stored on a recording medium and used by the content reproduction apparatus, includes a receiving step for receiving broadcast programs, a first reproducing step for reproducing the received broadcast programs on a monitor, a specifying step for specifying a broadcast program that will be reproduced without the commercial content being reproduced, and a second reproducing step for reproducing the stored commercial content on the monitor when the broadcast program being reproduced is not the specified broadcast program.

According to the above construction, the commercial content (hereafter, simply "CC") is not reproduced during specified broadcast programs, thus allowing the viewer to enjoy prioritized broadcast programs in a totally relaxed atmosphere without the interruption of commercials.

As a variation of the above construction, the attribute judging unit can include an attribute storing unit for storing one or more attributes selected by a user. This allows the viewer to select, in advance, a broadcast program to be enjoyed without the interruption of commercials. The attribute judging unit can also include an information storing unit for storing information that shows whether the broadcast program is (a) a pay broadcast program and (b) a subscribed broadcast program. The attribute judging unit then judges, by referring to the stored information, whether the broadcast program being reproduced is (a) a pay broadcast program and (b) a subscribed broadcast program, and the specifying unit specifies the broadcast program judged to be a subscribed pay broadcast program as the broadcast program that will be reproduced without the commercial content being reproduced. Thus the viewer can enjoy watching a prioritized pay broadcast program without the interruption of commercials.

The information stored on the information storing unit can also shows whether the broadcast program is an image, sound, or data broadcast program. The attribute judging unit then judges whether the broadcast program being reproduced is an image, sound, or data broadcast program by referring to the stored information, and the specifying unit specifies the broadcast program judged to be an image broadcast program as the broadcast program that will be reproduced without the commercial content being reproduced. Thus the reproduction of the CC is effectively controlled in accordance with a broadcast program type, and the viewer is able to watch the commercials at times that are convenient.

The first objective of the present invention can also be achieved by a content reproduction apparatus that includes a content storing unit for storing commercial content, a receiving unit for receiving broadcast programs, a first reproducing unit for reproducing the received broadcast programs on a monitor, a non-broadcast period storing unit for storing non-broadcast period information showing a non-broadcast period, a non-broadcast period judging unit for judging whether a present time corresponds to the non-broadcast period shown in the stored non-broadcast period information, and a second reproducing unit for reproducing the stored commercial content on the monitor when the present time is judged to correspond to the shown non-broadcast period. In this construction, the CC is reproduced during the reproduction of broadcast programs that are not prioritized by the viewer, thus allowing the viewer to watch the CC with minimum inconvenience.

A second objective of the present invention can be realized by providing (a) a content reproduction apparatus for reproducing content, being commercials and the like, during a timeslot specified as being effective for communicating the content of the commercials to the viewer, and (b) a related reproduction method. The content reproduction apparatus includes a content storing unit for storing commercial content, a receiving unit for receiving broadcast programs, a first reproducing unit for reproducing the received broadcast programs on a monitor, a registered instruction storing unit for storing one or more specified user instructions, an instruction receiving unit for receiving a user instruction, an instruction judging unit for judging whether the received user instruction corresponds to any of the stored user instructions, and a second reproducing unit for reproducing the stored commercial content on the monitor when the received user instruction is judged to correspond to one of the stored user instructions.

The second objective can also be achieved by a content reproduction apparatus that includes a content storing unit for storing commercial content, a receiving unit for receiving broadcast programs, a first reproducing unit for reproducing the received broadcast programs on a monitor, a pre-select information storing unit for storing information showing a pre-select timeslot of the broadcast programs, a pre-select judging unit for judging, by referring to the stored information, whether a present time is within a predetermined period occurring before and after the pre-select timeslot, and a second reproducing unit for reproducing the stored commercial content on the monitor when the present time is judged to be within the predetermined period.

The reproduction method for the content reproduction apparatus of the second objective includes a receiving step for receiving broadcast programs, a first reproducing step for reproducing the received broadcast programs on a monitor, an instruction receiving step for receiving a user instruction, an instruction judging step for judging whether the received user instruction corresponds to any of the stored user instructions, and a second reproducing step for reproducing the stored commercial content on the monitor when the received user instruction is judged to correspond to one of the stored user instructions.

Also, a computer program of the second objective, which is stored on a recording medium and used by the content reproduction apparatus, includes a receiving step for receiving broadcast programs, a first reproducing step for reproducing the received broadcast programs on a monitor, an instruction receiving step for receiving a user instruction, an instruction judging step for judging whether the received user instruction corresponds to any of the stored user instructions, and a second reproducing step for reproducing the stored commercial content on the monitor when the received user instruction is judged to correspond to one of the stored user instructions.

The above construction allows for the CC to be reproduced during periods that are effective for communicating the content of the commercials to the viewer.

As a variation of the above construction, the second reproducing unit can also include a display-mode controlling unit for controlling a reproduction display-mode of the commercial content in accordance with a content of the user instruction judged to correspond to one of the stored user instructions. In this construction, an appropriate display mode for the reproduction of the CC is set in accordance with the content of the user instruction, thus allowing the viewer to suitably adjust the viewing conditions and comfortably watch the CC in the desired mode.

The content reproduction apparatus of the second objective can further include a canceling unit for canceling a reproduction of the commercial content, and the canceling unit can further include a termination instruction receiving unit for receiving a termination instruction from a user to terminate the reproduction of the commercial content being reproduced, and an acceptance judging unit for judging, in accordance with a content of the user instruction judged to correspond to one of the stored user instructions, whether the termination instruction should be accepted. The canceling unit then cancels the reproduction of the commercial content being reproduced when the termination instruction is judged to be acceptable.

In this construction, the reproduction of CC currently being reproduced is terminated, thus preventing any inconvenience from being caused to the viewer who does not want to watch the commercials. The canceling unit can also be made to cancel the reproduction of the commercial content during a broadcast program when the broadcast program is a specified broadcast program.

The canceling unit can include a broadcast program type judging unit for judging whether the broadcast program being reproduced is a pay broadcast program, and a subscription judging unit for judging, when the broadcast program is judged to be a pay broadcast program, whether the broadcast program being reproduced has been subscribed. The canceling unit then cancels the reproduction of the commercial content when the broadcast program is judged to be a subscribed pay broadcast program.

In this construction, the CC is not reproduced during specified broadcast programs that the viewer wants to enjoy without the interruption of commercials.

BRIEF DESCRIPTION OF THE DRAWINGS

These and the other objects, advantages, and features of the invention will become apparent from the following description thereof taken in conjunction with the accompanying drawings which illustrate a specific embodiment of the invention.

In the drawings:

FIG. 2 is an example table showing a relationship between a broadcast program, a display mode, and a reproduction-off instruction acceptance condition;

FIG. 3 shows an example of broadcast program pre-select information;

FIG. 4 shows an example of broadcast program information;

FIG. 5 shows an example of subscription information;

FIG. 9 is an example table showing a relationship between a registered instruction, a display mode, and a reproduction-off instruction acceptance condition;

FIG. 12 is a flowchart showing a process conducted by content reproduction apparatus 100 to control the reproduction of the CC based on broadcast program attribute information indicated by a user instruction;

FIG. 13 is a flowchart showing a process conducted by content reproduction apparatus 100 to control the reproduction of the CC; and FIG. 14 is a flowchart showing a process conducted by content reproduction apparatus 200 to cancel the reproduction of the CC depending on the broadcast program even when a registered instruction is detected.

DESCRIPTION OF THE PREFERRED EMBODIMENTS

The embodiments of the present invention will now be described with reference to the drawings.

First Embodiment

Figure 1:
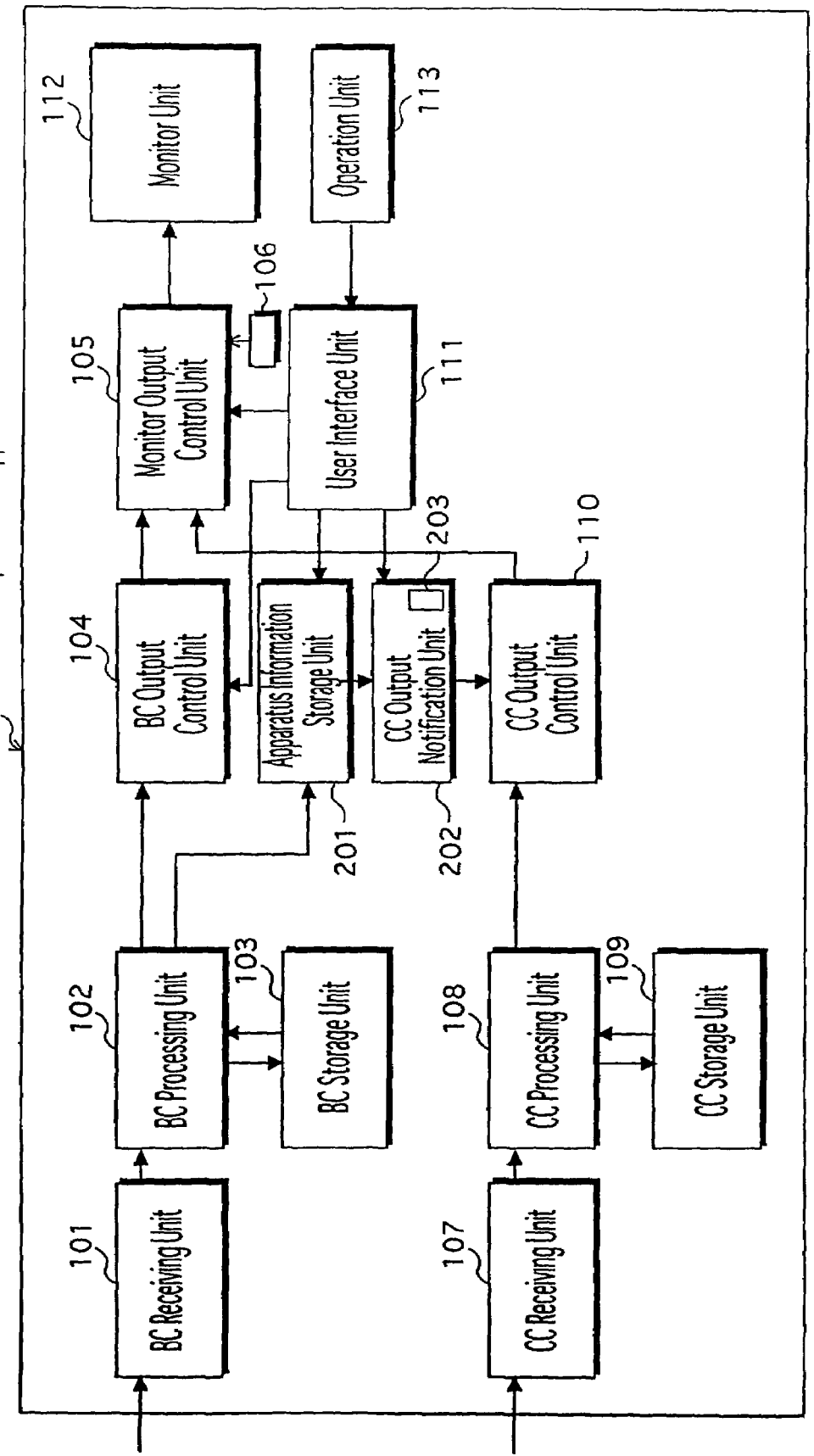
FIG. 1 is a block diagram showing an internal structure of a content reproduction apparatus 100 according to the first embodiment.

FIG. 1 is a block diagram showing the internal structure of content reproduction apparatus 100 according to the first embodiment. Content reproduction apparatus 100 functions generally to receive broadcast program content (hereafter, simply "BC"), being image, sound, and other data, and reproduce the received BC, and more particularly to store CC and cancel the reproduction of the CC during specified broadcast programs.

CC is composed of product and service commercials, event and TV programming announcements, local municipality, traffic, and weather information, and other data related to daily living. CC data is reproduced automatically on a monitor at predetermined periods during the reproduction of BC.

Content reproduction apparatus 100 is composed of a CPU, ROM, RAM, hard disk, tuner, demodulator, filter, decoder, USB (universal serial bus), RS-232C (recommendation standard-232C), monitor, remote-control, keyboard, modem, etc, and includes a BC receiving unit 101, a BC processing unit 102, a BC storage unit 103, a BC output control unit 104, a monitor output control unit 105, a table storage unit 106, a CC receiving unit 107, a CC processing unit 108, a CC storage unit 109, a CC output control unit 110, a user interface unit 111, a monitor unit 112, an operation unit 113, an apparatus information storage unit 201, and a CC output notification unit 202.

According to the first embodiment, monitor unit 112 and operation unit 113 can exist externally to content reproduction apparatus 200, which is operated by the CPU performing processing procedures in accordance with computer programs stored on either the ROM or the hard disk.

BC receiving unit 101 demodulates digital broadcast signals received from a broadcast station into a transport stream, being digital data, separates specified BC and broadcast information out from the transport stream by selecting a packet, and outputs the specified BC and broadcast information to BC processing unit 102. Broadcast information, an example of which is given in FIG. 4, includes broadcast program title, channel, and timeslot information related to the specified BC.

BC processing unit 102 functions to (a) store the outputted BC on BC storage unit 103 and the outputted broadcast program information on apparatus information storage unit 201; (b) read, decode, and output the stored BC to BC output control unit 104 in accordance with a BC output instruction received from BC output control unit 104; and (c) decode the BC received from BC receiving unit 101 and output the decoded BC directly to BC output control unit 104.

As mentioned above, BC storage unit 103 stores the BC outputted to BC processing unit 102 from BC receiving unit 101.

BC output control unit 104 controls the output of BC to monitor output control unit 105 in accordance with a BC output instruction received from user interface unit 111. BC output instructions are instructions related to power on/off, channel selection, volume and sound adjustments, and so on.

Monitor output control unit 105 controls the display mode of the BC and the CC on monitor unit 112. When a broadcast program being reproduced on a selected channel is judged by CC output notification unit 202 to correspond to a specified broadcast program, monitor output control unit 105 receives the BC from BC output control unit 104 and the CC from CC output control unit 110, reads from table storage unit 106 a table showing a relationship between a broadcast program, a display mode, and a reproduction-off instruction acceptance condition, selects the display mode corresponding to the judged broadcast program, and reproduces the BC and the CC on monitor unit 112 in the selected display mode.

The display mode relates to reproduction period, size, and so on, of the CC. The reproduction period is the period required to reproduce the CC, and the size is a ratio of CC to BC displayed on the screen of monitor unit 112 (e.g. size=100: CC full-screen; size=50: CC/BC half-screen each).

The reproduction-off instruction acceptance condition shows whether a reproduction-off instruction, being a user instruction outputted from user interface unit 111 to monitor output control unit 105 to cancel the CC reproduction, should be accepted.

As mentioned above, table storage unit 106 stores the table showing the relationship between the broadcast program, the display mode, and the reproduction-off instruction acceptance condition. An example table is given in FIG. 2.

CC receiving unit 107 demodulates digital broadcast signals received from a broadcast station into a transport stream, being digital data, separates specified CC from the transport stream by selecting a packet, and outputs the specified CC to CC processing unit 108.

CC processing unit 108 functions to (a) store the outputted CC on CC storage unit 109, and (b) read, decode, and output the stored CC to CC output control unit 110 in accordance with a CC output instruction received from CC output control unit 110.

As mentioned above, CC storage unit 109 stores the CC outputted from CC receiving unit 107 to CC processing unit 108.

CC output control unit 110 instructs CC processing unit 108 to output the CC when notified of a CC output instruction by CC output notification unit 202, receives the CC from CC processing unit 108, and outputs the CC to monitor output control unit 105.

User interface unit 111 functions to (a) receive user instructions inputted via operation unit 113 and output the received user instructions to BC output control unit 104 and monitor output control unit 105; and (b) store, on apparatus information storage unit 201, pre-select information inputted by the user via operation unit 113. Pre-select information (FIG. 3) is information, such as channel, day, timeslot, broadcast program title, pre-selected by the user.

Monitor unit 112 displays the BC and the CC outputted from monitor output control unit 105 in the display mode selected by monitor output control unit 105.

Operation unit 113 receives input of instructions from the user such as BC output instructions and other user instruction relating to broadcast program pre-selection and so on.

Apparatus information storage unit 201 stores broadcast program, subscription, and pre-select information. Subscription information includes broadcast program type (i.e. pay broadcast program?) and subscription (i.e. subscribed?) information for each channel.

CC output notification unit 202 includes a time measuring unit 203 measuring date and time, and functions to monitor the broadcast programs and notify CC output control unit 110 of a CC output instruction to output the CC to monitor output control unit 105 depending on the broadcast program being reproduced.

Specifically, CC output notification unit 202 refers to broadcast program information read from apparatus information storage unit 201 in order to specify a selected channel and notifies CC output control unit 110 of a CC output instruction when:

(1) time information acquired from time measuring unit 203 and the broadcast program information of the selected channel indicate that the broadcast program is not being broadcast at the acquired time (hereafter, this period during which the broadcast program is not being broadcast is referred to as a "non-broadcast period," and occurs in the case of a test broadcast program, a color bar display, or a non-broadcast period indicator, etc, being displayed);

(2) subscription information (read from apparatus information storage unit 201) of the selected channel indicates that the broadcast program is an unsubscribed pay broadcast program; or (3) pre-select information (read from apparatus information storage unit 201) of the selected channel indicates that the broadcast program has been pre-selected and time information acquired from time measuring unit 203 indicates that the acquired time is within a predetermined period, being immediately before or after (e.g. within one minute of) the pre-select timeslot of the broadcast program.

The process by which content reproduction apparatus 100 controls the reproduction of the CC will now be described with reference to the flowchart in FIG. 6.

As mentioned above, CC output notification unit 202 refers to broadcast program information read from apparatus information storage unit 201 in order to specify the selected channel, and then refers to subscription information read from apparatus information storage unit 201 in order to judge whether the broadcast program is a pay broadcast program (step S1301).

If "no" (step S1301:N), then CC output notification unit 202 notifies CC output control unit 110 of a CC output instruction; CC output control unit 110 instructs CC processing unit 108 to output the CC, receives the CC, and outputs the received CC to monitor output control unit 105; and monitor output control unit 105 reproduces the outputted CC on monitor unit 112 (step S1307). If "yes" (step S1301:Y), then CC output notification unit 202 judges whether the broadcast program has been subscribed (step S1302).

If "no" (step S1302:N), then step S1307 is processed as described above. If "yes" (step S1302:Y), then CC output notification unit 202 compares the broadcast program timeslot with time information acquired from time measuring unit 203 (step S1303) in order to judge whether the broadcast program being reproduced is currently in a non-broadcast period (step S1303).

In "yes" (step S1303:Y), then step S1307 is processed as described above. If "no" (step S1303:N), then CC output notification unit 202 judges whether the broadcast program has been pre-selected (step S1304).

If "no" (step S1304:N), then monitor output control unit 105 continues to reproduce the BC on monitor unit 112 without interruption; that is, without reproducing the CC (step S1305). If "yes" (step S1304:Y), then CC output notification unit 202 judges whether the time shown in time information acquired from time measuring unit 203 is within the predetermined period (step S1306).

If "no" (step S1306:N), then step S1305 is processed as described above. If "yes" (step S1306:Y), then step S1307 is processed as described above.

Figure 7:
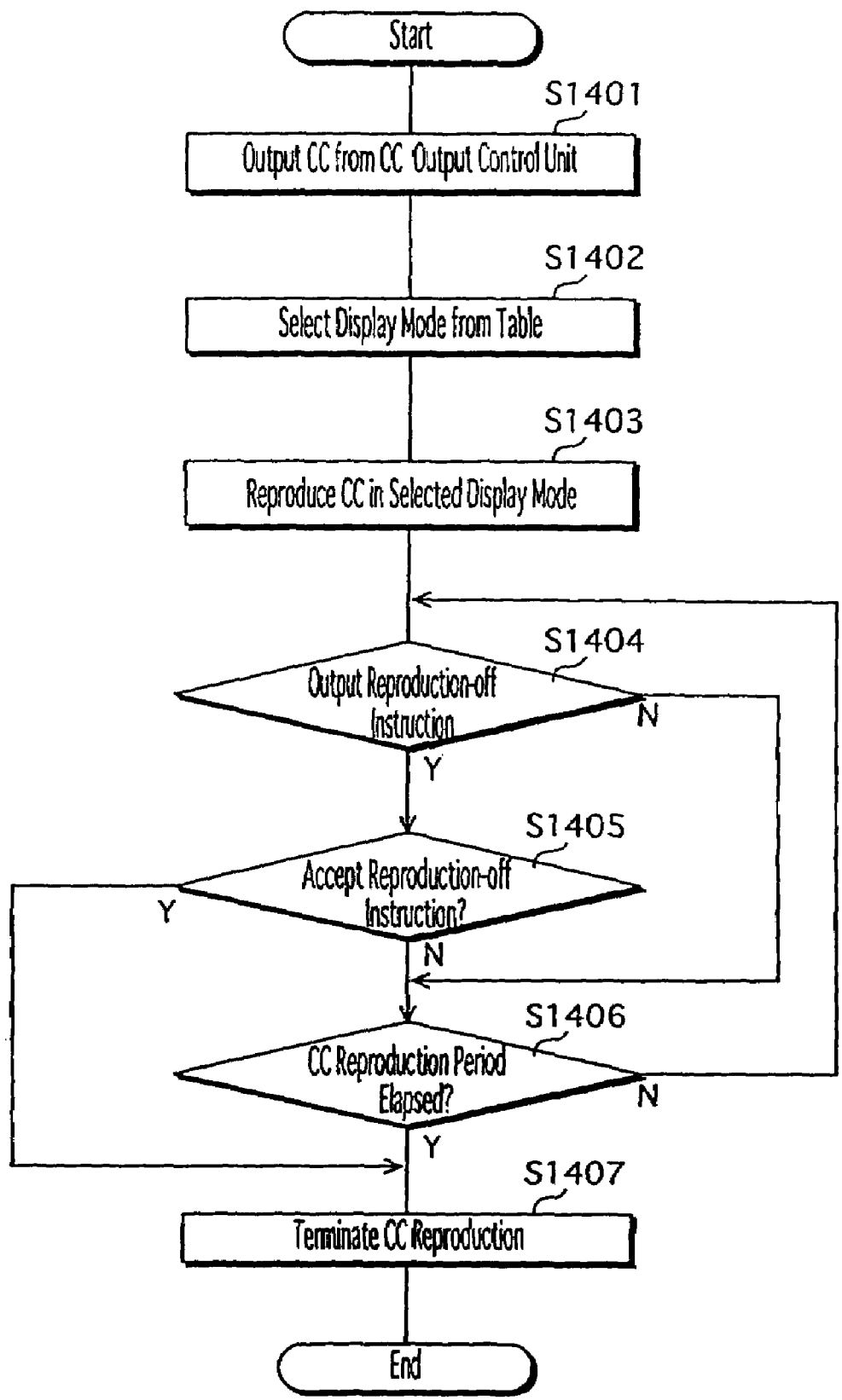
FIG. 7 is a flowchart showing a process conducted by a monitor output control unit 105 to control a display mode of the CC.

After the CC has been outputted from CC output control unit 110 in accordance with the broadcast program judged by CC output notifying unit 202, monitor output control unit 105 controls the display mode of the CC to be reproduced on monitor unit 112 (step S1307). This control process will now be described with reference to the flowchart in FIG. 7.

CC output control unit 110 outputs the CC to monitor output control unit 105 after being notified of the CC output instruction by CC output notifying unit 202 (step S1401). Monitor output control unit 105 then reads the table from table storage unit 106, selects the display mode corresponding to the broadcast program judged by CC output notifying unit 202 (step S1402), reproduces the broadcast program on monitor unit 112 in the selected display mode (step S1403), and judges whether there is output of a reproduction-off instruction from user interface unit 111 (step S1404).

If output of a reproduction-off instruction is not detected (step S1404:N), then monitor output control unit 105 judges whether the CC reproduction period has elapsed (step S1406).

If "yes" (step S1406:Y), then the reproduction of the CC is terminated (step S1407), and if "no" (step S1406:N), then the process from step S1404 is repeated.

On the other hand, if output of a reproduction-off instruction is detected (step S1404:Y), then monitor output control unit 105 refers to the reproduction-off instruction acceptance condition shown in the table read from table storage unit 106 in order to judge whether the reproduction-off instruction is acceptable (step S1405).

If "yes" (step S1405:Y), then step S1407 is processed as described above. If "no" (step S1405:N), then monitor output control unit 105 judges whether the reproduction period has elapsed (step S1406).

If "yes" (step S1406:Y), then step S1407 is processed as described above. If "no" (step S1406:N), then the process from step S1404 is repeated.

Second Embodiment

Figure 8:
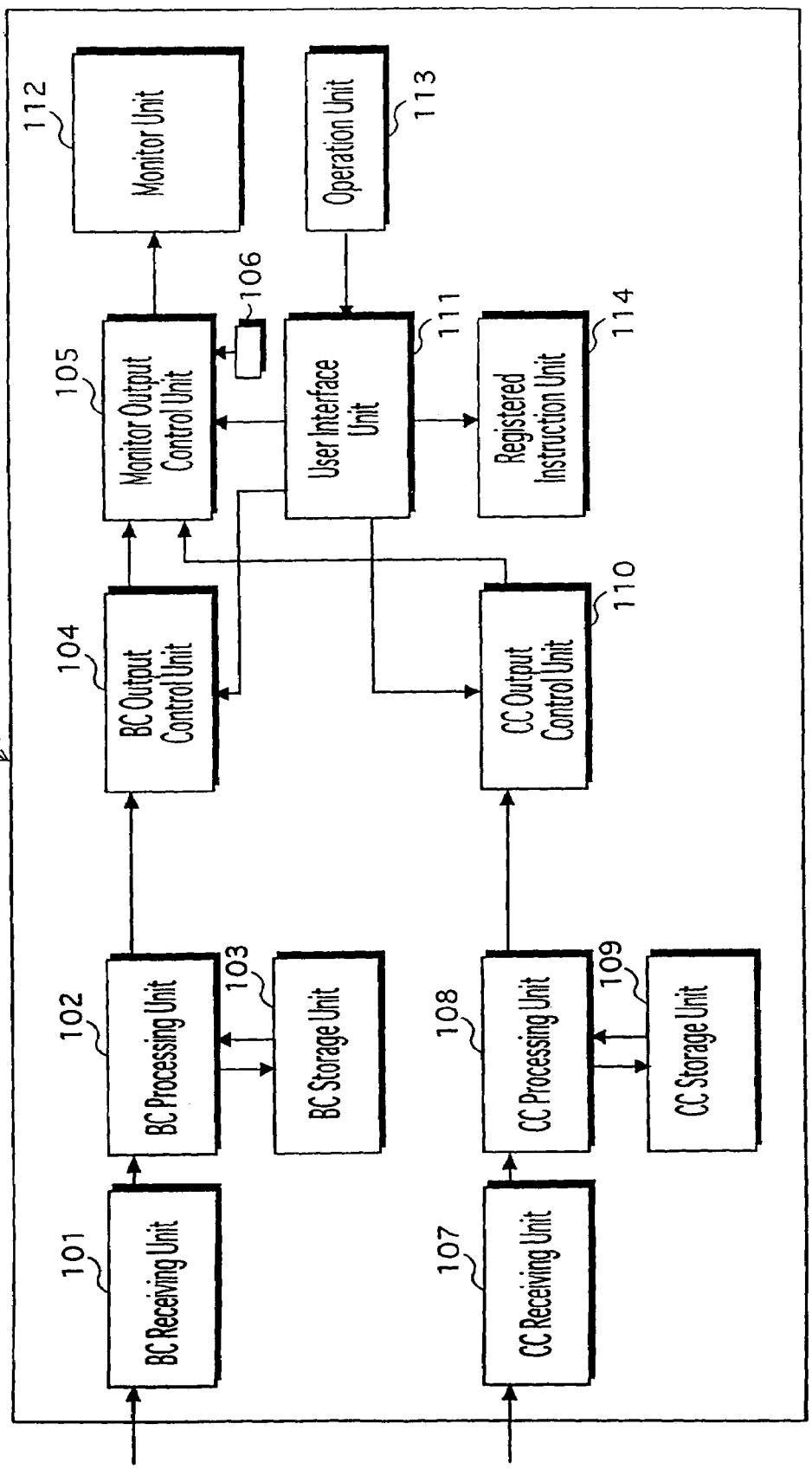
FIG. 8 is a block diagram showing an internal structure of a content reproduction apparatus 200 according to the second embodiment.

FIG. 8 is a block diagram showing an internal structure of a content reproduction apparatus 200 according to the second embodiment. Content reproduction apparatus 200 functions generally to receive BC and reproduce the received BC, and more particularly to store CC and control the timing and display mode of the stored CC at the time of reproduction.

Content reproduction apparatus 200 is composed of a CPU, ROM, RAM, hard disk, tuner, demodulator, filter, decoder, USB, RS-232C, monitor, remote-control, keyboard, modem, etc, and includes a BC receiving unit 101, a BC processing unit 102, a BC storage unit 103, a BC output control unit 104, a monitor output control unit 105, a table storage unit 106, a CC receiving unit 107, a CC processing unit 108, a CC storage unit 109, a CC output control unit 110, a user interface unit 111, a monitor unit 112, an operation unit 113, and a registered instruction storage unit 114.

According to the second embodiment, monitor unit 112 and operation unit 113 can exist externally to content reproduction apparatus 200, which is operated by the CPU performing processing procedures in accordance with computer programs stored on either the ROM or the hard disk.

Given the similarities between content reproduction apparatus 100 (FIG. 1) and 200 (FIG. 8), only the differences will be referred to in the description of content reproduction apparatus 200 below.

Monitor output control unit 105 controls the display mode of the BC and the CC reproduced on monitor unit 112. When a user instruction outputted from user interface unit 111 is a registered instruction, monitor output control unit 105 receives the CC outputted from CC output control unit 110, reads from table storage unit 106 a table showing a relationship between a broadcast program, registered instructions, and a reproduction-off instruction acceptance condition, selects a display mode corresponding to a content of the received registered instruction, and reproduces the BC and the CC on monitor unit 112 in the selected display mode.

Registered instructions are stored on the registered instruction storage unit 114 and consist of one or more specified user instructions that, once registered, function additionally as CC output instructions (i.e. additionally to an original function, being volume/sound change, etc).

As mentioned above, table storage unit 106 stores the table showing the relationship between the broadcast program, the registered instructions, and the reproduction-off instruction acceptance condition. An example table is given in FIG. 9.

CC output control unit 110 instructs CC processing unit 108 to output the CC in accordance with the registered instruction outputted from user interface unit 111, receives the CC from CC processing unit 108, and then outputs the CC to monitor output control unit 105.

User interface unit 111 reads the one or more registered instructions stored on registered instruction storage unit 114 when the input of a user instruction is received, and judges whether the inputted user instruction corresponds to any of the read registered instructions. The user instruction is only outputted to CC output control unit 110 if the user instruction is judged to be one of the registered instructions.

The process by which content reproduction apparatus 200 controls the reproduction of CC in accordance with the user instruction inputted via operation unit 113 will now be described with reference to the flowchart in FIG. 10.

When the input of a user instruction is detected (step S1501), user interface unit 111 reads the one or more registered instructions stored on registered instruction storage unit 114 and judges whether the detected user instruction corresponds to any of the registered instructions (step S1502).

If "no" (step S1502:N), then user interface unit 111 does not output the user instruction to CC output control unit 110, and monitor output control unit 105 continues to reproduce the BC on monitor unit 112 without interruption; that is, without reproducing the CC (step S1506).

If "yes" (step S1502:Y), then user interface unit 111 outputs the user instruction to CC output control unit 110 (step S1503); CC output control unit 110 instructs CC processing unit 108 to output the CC, receives the CC, and outputs the received CC to monitor output control unit 105 (step S1504). Monitor output control unit 105 then reproduces the outputted CC on monitor unit 112 (step S1505).

Figure 11:
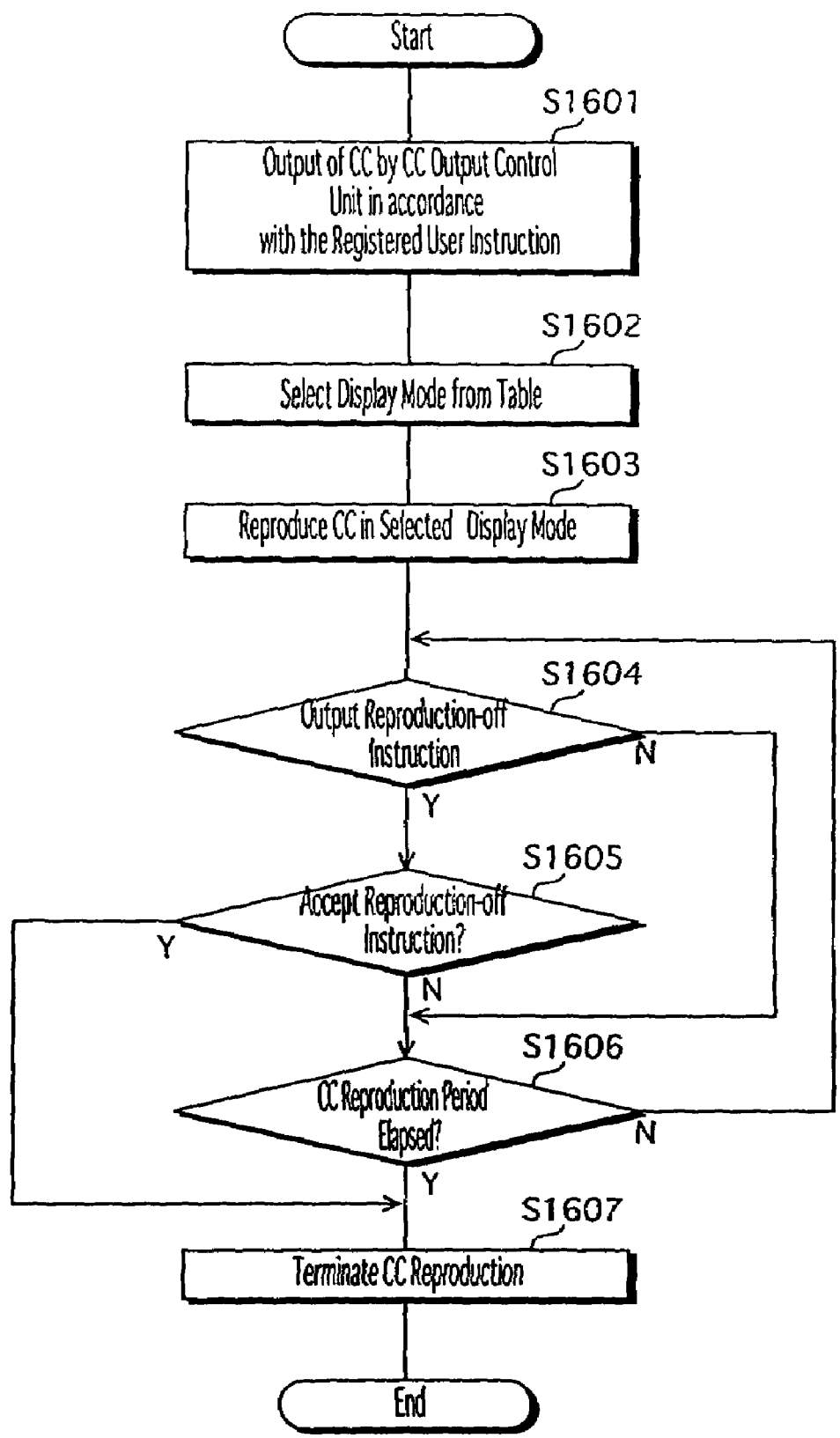
FIG. 11 is a flowchart showing a process conducted by a monitor output control unit 105 to control the display mode of the CC.

After the CC has been outputted from CC output control unit 110 (step S1504), monitor output control unit 105 controls the display mode of the CC to be reproduced on monitor unit 112 (step S1505). This control process will now be described with reference to the flowchart in FIG. 11.

CC output control unit 110 outputs the CC to monitor output control unit 105 in accordance with the registered instruction received from user interface unit 111 (step S1601). Monitor output control unit 105 then reads the table from table storage unit 106, selects a display mode corresponding to the content of the received registered instruction (step S1602), reproduces the CC on monitor unit 112 in the selected display mode (step S1603), and judges whether there is output of an reproduction-off instruction from user interface unit 111 (step S1604).

If output of a reproduction-off instruction is not detected (step S1604:N), then monitor output control unit 105 judges whether the CC reproduction period has elapsed (step S1606).

If "yes" (step S1606:Y), then the reproduction of the CC is terminated (step S1607), and if "no" (step S1606:N), then the process from step S1604 is repeated.

On the other hand, if output of a reproduction-off instruction is detected (step S1604:Y), then monitor output control unit 105 refers to the reproduction-off instruction acceptance condition shown in the table read from table storage unit 106 in order to judges whether the reproduction-off instruction is acceptable (step S1605).

If "yes" (step S1605:Y), then step S1607 is processed as described above. If "no" (step S1605:N), then monitor output control unit 105 judges whether the reproduction period has elapsed (step S1606).

If "yes" (step S1606:Y), then step S1607 is processed as described above. If "no" (step S1606:N), then the process from step S1604 is repeated.

The first and second embodiments of the present invention are as described above. The present invention is, however, not limited to the described embodiments.

In the first embodiment, the CC stored on CC storage unit 109 can, for instance, be data received from the Internet. Also, in the second embodiment, a new service can be developed that allows (a) the user to receive a discount on pay broadcast program subscription by using, instead of CC storage unit 109, a removable media storing CC, and (b) the advertiser to effectively communicate the content of the commercials to the user.

According to the first embodiment (FIG. 6), broadcast program, subscription, and pre-select information is used to specify broadcast programs during a reproduction period of which the CC reproduction is to be canceled. It is, however, possible for the reproduction of CC to be canceled for broadcast programs having an attribute specified by the user.

For example, genre identifiers showing the genre of broadcast programs can be provided for each broadcast program title included in broadcast program information received by BC receiving unit 101, and one or more genre identifiers selected by the user can be stored on apparatus information storage unit 201 as selected genre information. When CC output notifying unit 202 judges that the genre of a broadcast program corresponds to one of the genres selected by the user, the reproduction of the CC is canceled. What follows is a description of this process conducted by content reproduction apparatus 100 with reference to the flowchart in FIG. 12.

CC output notifying unit 202 reads broadcast program information from apparatus information storage unit 201, acquires time information from time measuring unit 203, refers to the read broadcast program information in order to specify the broadcast program title of the broadcast program being reproduced during the broadcast program timeslot corresponding to the acquired time (step S1701), and specifies the genre identifier provided with the specified broadcast program title (step S1702). CC output notifying unit 202 then reads the selected genre information from apparatus information storage unit 201, and compares the specified genre identifier with the one or more genre identifiers stored in the selected genre information in order to judge whether there is a correspondence (step S1703).

If "yes" (step S1703:Y), then CC output notifying unit 202 does not notify CC output control unit 110 of an output instruction, and monitor output control unit 105 continues to reproduce the BC on monitor unit 112 without interruption; that is, without reproducing the CC (step S1704).

If "no" (step S1703:N), then CC output notifying unit 202 notifies CC output control unit 110 of an output instruction; CC output control unit 110 instructs CC processing unit 108 to output the CC, receives the CC, and outputs the CC to monitor output control unit 105; and monitor output control unit 105 reproduces the CC on monitor unit 112 (step S1705).

Broadcast program type information indicating whether the broadcast program is an image, sound, or data broadcast program, can also be included in the broadcast program information received by BC receiving unit 101, and it is possible for CC output notifying unit 202 to cancel the CC reproduction when the broadcast program is judged, in accordance with the broadcast program type information, to be an image broadcast program. What follows is a description of this process conducted by content reproduction apparatus 100 with reference to the flowchart in FIG. 13.

CC output notifying unit 202 reads broadcast program information from apparatus information storage unit 201, refers to the read broadcast program information in order to acquire a broadcast program type (step S1801), and judges whether the acquired broadcast program type is an image broadcast program (step S1802).

If "yes" (step S1802:Y), then CC output notifying unit 202 does not notify CC output control unit 110 of an output instruction, and monitor output control unit 105 continues to reproduce the BC on monitor unit 112 without interruption; that is, without reproducing the CC (step S1803).

If "no" (step S1802:N), then CC output notifying unit 202 notifies CC output control unit 110 of an output instruction; CC output control unit 110 instructs CC processing unit 108 to output the CC, receives the CC, and outputs the CC to monitor output control unit 105; and monitor output control unit 105 reproduces the CC on monitor unit 112 (step S1804).

The registered instructions in the second embodiment are not limited to the types shown in FIG. 9. For instance, it is possible for registered instruction storage unit 114 to store all of the user instructions inputted via operation unit 113. This would be advantageous for the advertiser since every user instruction inputted to content reproduction apparatus 100 would result in the reproduction of the CC.

Also, the registered instructions according to the second embodiment can be (a) instructions stored on registered instruction storage unit 114 at the time that content reproduction apparatus 100 is shipped, or (b) user instructions selected by the user, being all or some of the user instructions permitting the reproduction of the CC.

Figure 10:
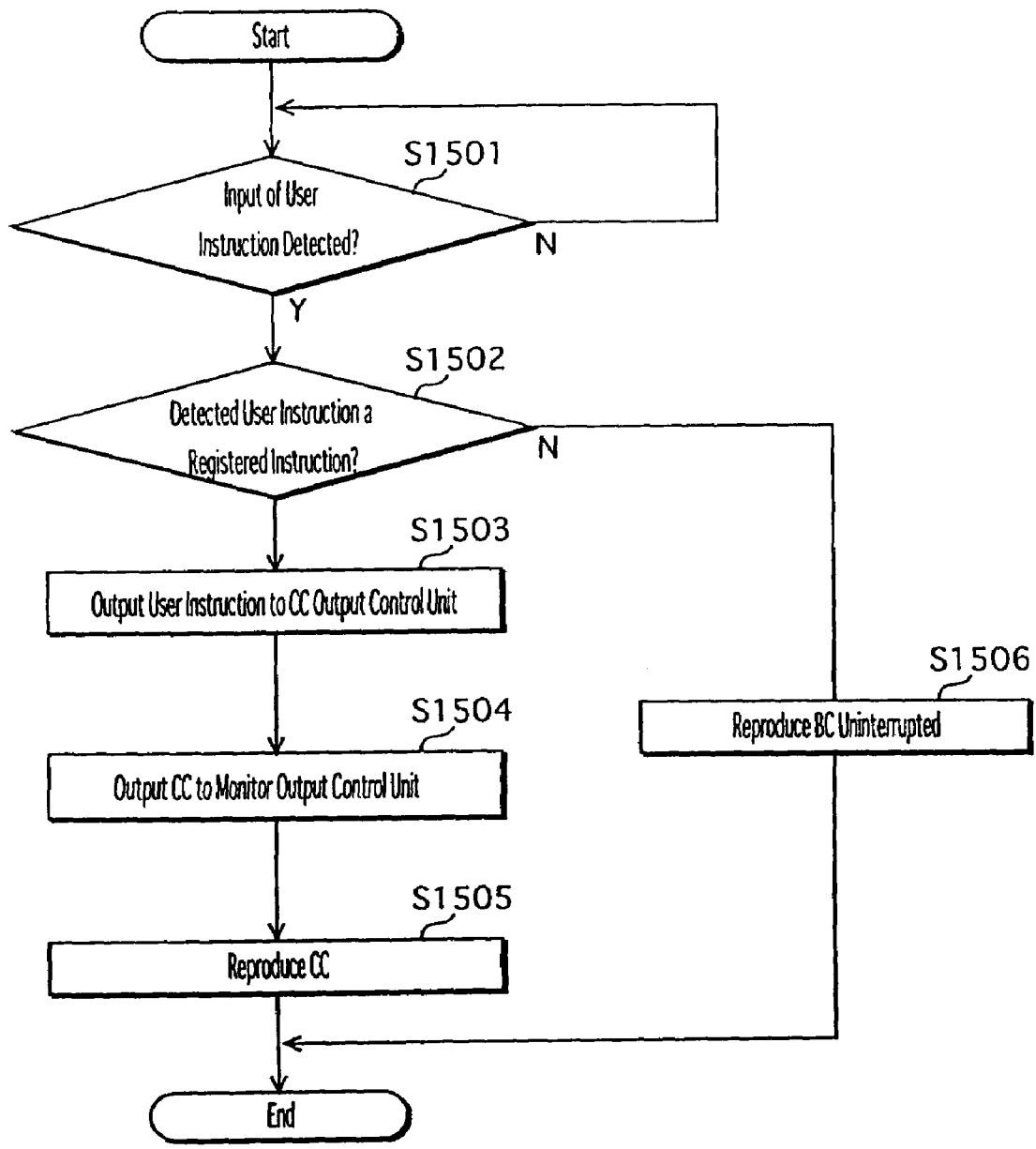
FIG. 10 is a flowchart showing a process conducted by content reproduction apparatus 200 to control the reproduction of the CC.

According to the second embodiment, the CC is reproduced when input of a registered instruction is received (FIG. 10). It is, however, possible, depending on the broadcast program, to have the CC reproduction canceled even when a registered instruction is inputted. This process conducted by content reproduction apparatus 200 will now be described with reference to the flowchart in FIG. 14 (includes steps shown in FIGS. 6 and 10).

Figure 6:
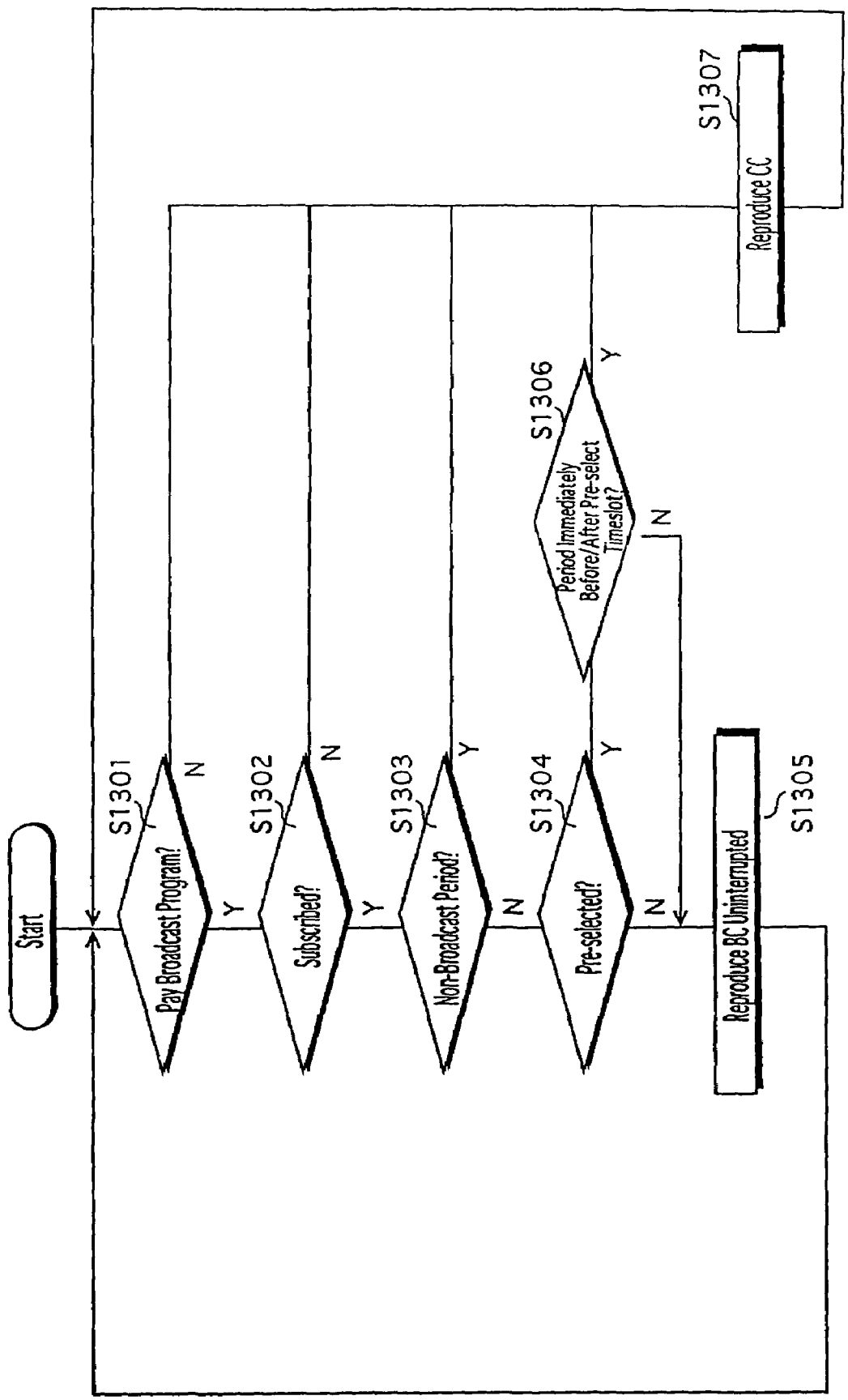
FIG. 6 is a flowchart showing a process conducted by content reproduction apparatus 100 to control a reproduction of CC.

When user interface unit 111 judges that the detected user instruction corresponds to one of the read registered instructions (step S1502:Y), then CC output notification unit 202 judges whether the broadcast program is a pay broadcast program (step S1301 in FIG. 6). If "yes" (step S1301:Y), then CC output notification unit 202 proceeds to judge whether the broadcast program has been subscribed (step S1302). If "yes" (step S1302:Y), then the output of the CC is canceled and monitor output control unit 105 continues to reproduce the BC on monitor unit 112 without interruption; that is, without reproducing the CC (step S1305).

If the broadcast program is not a pay broadcast program (step S1301:N) or if the broadcast program is an unsubscribed pay broadcast program (step S1302:N), then monitor output control unit 105 reproduces the CC on monitor unit 112 (step S1307).

Although the present invention has been fully described by way of examples with reference to the accompanying drawings, it is to be noted that various changes and modifications will be apparent to those skilled in the art. Therefore, unless such changes and modification.

What is claimed is:

1. A content reproduction apparatus, comprising:
   instruction receiving means for receiving instruction for channel selection;
   apparatus information storage means for storing broadcast program information indicating a timeslot of a broadcast program for each channel and pre-select information indicating a timeslot of a broadcast program for a channel preselected by a user;
   content storing means for storing commercial content;
   receiving means for receiving broadcast programs;
   first reproducing means for reproducing the received broadcast programs on a monitor;
   pre-select 1st judging means for judging, by referring to the broadcast program information and the pre-select information, whether the selected channel is the channel of the pre-selected broadcast program or not;
   pre-select 2nd judging means for judging, when the selected channel is the channel of the pre-selected broadcast program, by referring to the pre-select information, whether a present time is within either one of (i) a predetermined period that is before the pre-select timeslot, and (ii) a predetermined period that is after the pre-select timeslot; and
   second reproducing means for reproducing the stored commercial content on the monitor when the present time is judged to be within the predetermined period.

2. The content reproduction apparatus of claim 1, wherein the apparatus information storage means further stores subscription information that the broadcast program of each channel is a subscribed pay broadcast program or an unsubscribed pay broadcast program, and the content reproduction apparatus further compromising;
   non-broadcast period judging means for judging, by referring to the broadcast program information, whether the broadcast program of the selected channel is being broadcast or not; and
   subscription judging means for judging, by referring to the stored subscription information, whether the broadcast program of the selected channel is an unsubscibed pay broadcast program or a subscribed pay broadcasting program,
   wherein the second reproducing means reproduces the stored commercial content on the monitor when the broadcast program of the selected channel is not being broadcast and is an unsubscribed pay broadcast program.

* * * * *

UNITED STATES PATENT AND TRADEMARK OFFICE
CERTIFICATE OF CORRECTION

PATENT NO. : 7,614,067 B2
APPLICATION NO. : 11/022393
DATED : November 3, 2009
INVENTOR(S) : Sugimoto et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1190 days.

Signed and Sealed this

Nineteenth Day of October, 2010

David J. Kappos
*Director of the United States Patent and Trademark Office*